UNITED STATES PATENT OFFICE.

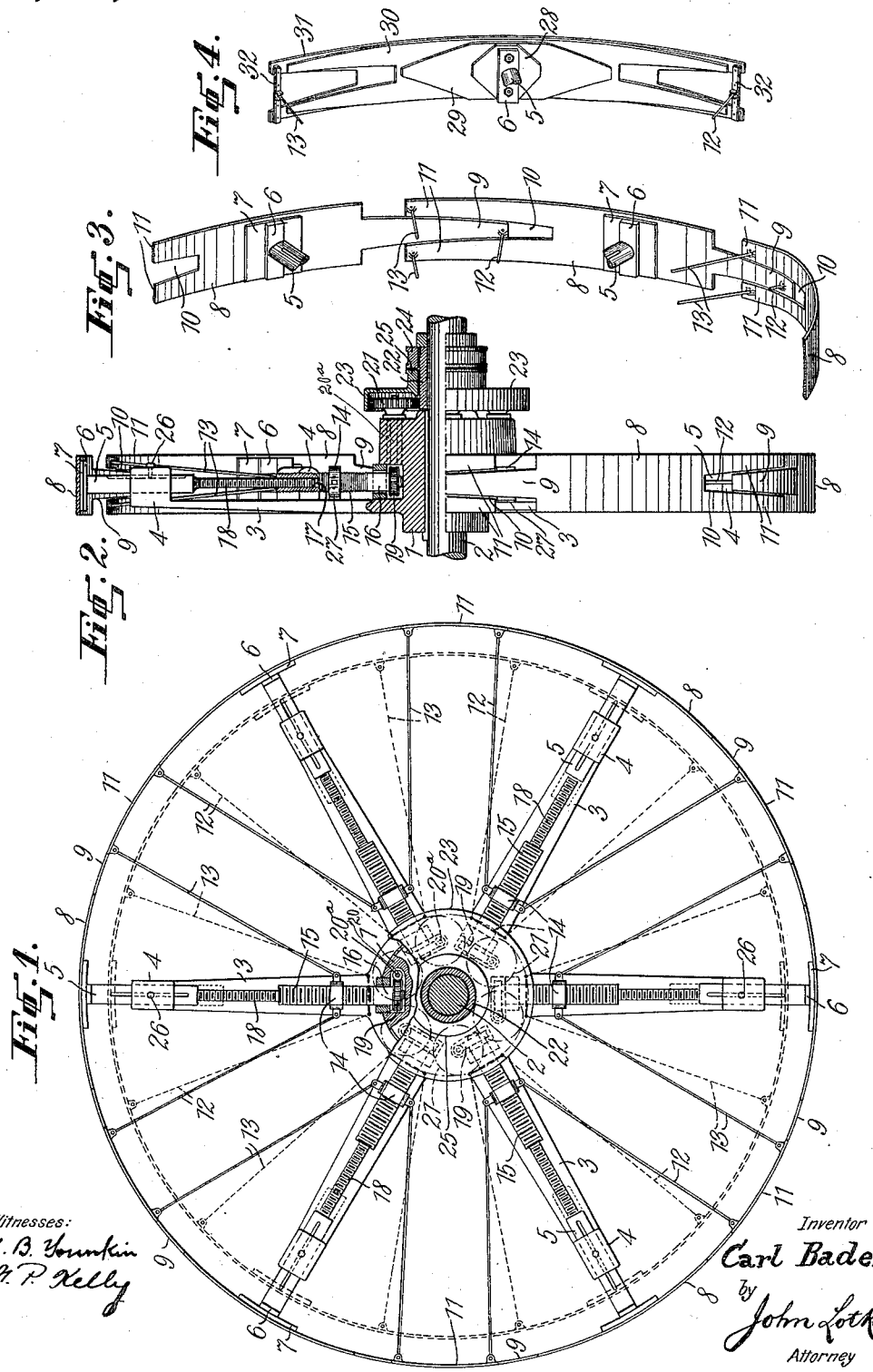

CARL BADER, OF DESSAU, GERMANY, ASSIGNOR TO BERLIN-ANHALTISCHE MASCHIN-ENBAU-AKTIEN-GESELLSCHAFT, OF DESSAU, GERMANY, A CORPORATION OF GERMANY.

EXPANSIBLE PULLEY.

1,032,803.  Specification of Letters Patent.  Patented July 16, 1912.

Application filed August 28, 1911. Serial No. 646,360.

*To all whom it may concern:*

Be it known that I, CARL BADER, a subject of the Grand Duke of Baden, and a resident of Dessau, in the Duchy of Anhalt and German Empire, have invented certain new and useful Improvements in Expansible Pulleys, of which the following is a specification.

My invention relates to expansible pulleys and has for its object to improve them in the several respects pointed out hereinafter, having in view the particular object of reducing the weight of the peripheral portion of the wheel yet at the same time preserving its circular shape when its diameter is altered.

Expansible pulleys are generally made with spokes carrying rim segments and movable in suitable guides provided on the hub. Of course, as the diameter of the pulley is increased, spaces are liable to form between the ends of adjacent rim segments, and as these spaces would affect the regular operation of the transmission belt, the shifting spokes have been provided with thin sheet metal plates movable peripherally and connected telescopically or overlapping; these plates remain in engagement with one another during all the adjustments of the pulley, so that the latter presents a continuous engaging surface to the belt whether adjusted to the largest or to the smallest diameter or in any intermediate position.

By using thin sheet metal plates to complete the rim of the pulley, the advantage is secured that the rim becomes relatively light, thus reducing the centrifugal force exerted by the adjustable spokes and the rim segments, which centrifugal force is troublesome especially if it be desired to reduce the diameter of the pulley while running, since in that case centrifugal force opposes the adjusting action. Notwithstanding, the rim construction just referred to has certain defects, one of them being that the rim plates, owing to their yielding character, do not automatically take the different degrees of curvature corresponding to the different diameters of the pulley as the same is expanded or contracted; the pulley is therefore liable to become untrue.

My invention aims to combine the advantages secured by making the rim substantially of light flexible material, with means to keep the pulley rim truly circular notwithstanding adjustments in the diameter of the pulley. For this purpose I provide adjusting members adapted to alter the curvature of the rim segments automatically as the pulley is expanded or contracted, so that the curvature will correspond in each case to the particular diameter of the pulley. Specifically, I connect the ends of the rim segments pivotally with members adapted to exert a pull when the pulley is being contracted, and outward pressure when the pulley is being expanded; these adjusting members are positively connected with the adjustable spokes, so that the adjustment of the spokes will automatically operate such adjusting members to give to the rim segments the particular curvature corresponding to the diameter in each individual adjustment. Thus, when the diameter of the pulley is increased, the flexible rim segments will be straightened out automatically in a measure corresponding to the adjustment of the spokes, and when the diameter is reduced the degree of curvature will be increased automatically in the proper ratio.

A very simple construction embodying my invention is obtained by employing a screw spindle having threads of different pitch for producing at the same time the different movements of the adjustable spokes on the one hand and of the curvature-adjusting members on the other hand. In order to give the flexible rim segments the shape of true circular arcs, I prefer to construct them as bodies of uniform resistance to bending strains, for instance as compound or graduated leaf springs.

Two typical examples of my invention are illustrated by the accompanying drawings, in which—

Figure 1 is a face view of a pulley constructed according to my invention, with parts in section; Fig. 2 is partly a side view of said pulley (at the bottom) and partly a vertical section (at the upper half); Fig. 3 is a perspective view showing a portion of the pulley rim; and Fig. 4 is a perspective of one of the rim segments, constructed in a somewhat different manner.

In the construction illustrated by the drawings, the hub 1 serving to secure the pulley upon the shaft 2, carries rigidly six radial spokes or spoke sections 3 provided at their outer guiding portions 4 with the adjustable spoke sections 5, which are mounted to slide radially in said guide portions 4. The outer ends of the adjustable spoke sections 5 carry heads 6 to which the rim segments 8 are secured, with the interposition of reinforcing plates 7.

The rim segments are made of sheet metal of such thickness that on the one hand the pulley rim will not be deformed by the pull of the belt, and on the other hand the bending of the rim segments will require as little energy as possible. Each rim segment 8 is provided at one end with a circumferential tapering tongue 9 arranged to fit into a correspondingly shaped slot 10 provided at the mating end of the adjacent rim section (Fig. 3). The tongues 9 are of such length as to remain within the respective slots 10 even when the pulley is expanded to the maximum diameter.

At the end of each tongue 9 and of each of the fork members 11 at the sides of the slots 10, of the several rim segments 8, curvature-adjusting members or rods 12 and 13 respectively are attached pivotally, the inner ends of such rods having a similar connection with the movable nuts 14. These nuts are mounted on the threads 15 of screw spindles 16, arranged in line with the respectively adjustable spoke sections 5 and journaled in the hub 1, but held against radial movement. The spindles 16 are bored out and internally threaded at their outer ends, as indicated at 17, to receive the screw-threaded rods 18 which project inwardly from the adjustable spoke sections 5 and are secured thereto rigidly.

For the sake of a simple construction the rods 12 and 13 are connected with the nuts 14 of the particular segment 8 whose spoke is nearest to such rods, and thus in the particular construction shown, each rim segment is controlled by the nuts belonging to two adjacent spokes.

In order to adjust the spokes 5 simultaneously, all the spindles 16 may be rotated at the same time. In the example shown, the inner end of each spindle is provided for this purpose with a worm wheel 19 in mesh with a worm 20. The shaft 20ª of each worm is parallel to the pulley shaft 2 and projects at one end of the hub 1. On such projecting end is secured a pinion 21 in mesh with the external teeth of a sleeve 22 mounted loosely on the shaft 2, and also in mesh with the internal teeth of a disk 23 mounted to turn on the sleeve 22. The sleeve 22 and the disk 23 are provided with brake bands 24 and 25 respectively. These bands, operating in conjunction with brakes (not shown) of any approved construction, can be made to retard either the sleeve 22 or the disk 23 while the pulley rotates, so that in the one case the disk 23 will revolve while the sleeve is retarded, and in the other case the sleeve 22 will revolve while the disk 23 is retarded. Thus the worms 20 and spindles 16 will be rotated together, in one direction or the other, according as the disk 23 or the sleeve 22 is retarded.

In order to prevent the rod-like outer spoke sections 5 from turning with the spindles 16, pins 26 secured to the guide portions 4 of the rigid or fixed inner spoke sections 3 are fitted into grooves of the adjustable sections 5, see Fig. 2. Similarly, the round movable nuts 14 are kept from turning by means of stop plates 27 engaging the fixed spoke sections 3.

If it be desired, for instance, to contract the pulley from the size indicated in Fig. 1 by solid lines to the diameter indicated by dotted lines, the brake acting on the band 25 is operated to retard the disk 23. This will cause the pinions 21 to roll on the internal teeth of the disk 23 so that all the spindles 16 will be rotated in unison, in the same direction, by means of the worms 20 and worm wheels 19. This rotation will cause the guide rods 18 of the spoke sections 5 as well as the nuts 14 to be shifted radially inward, since the threads of the spindle portions 15 and 17 are of like direction. The threads are however of different pitch, the pitch of the outer portions 15 being greater than that of the inner portions 17, and the proportions are so selected that the radial travel of the nuts 14 will exceed the radial travel of the guide rods 18 by an amount corresponding to the increase in the curvature of the segments 8 required in view of the reduced diameter of the pulley. That is to say, the rods 12, 13 connected with the rim segments and with the nuts 14 will draw the ends of each elastic or flexible segment inward relatively to its central portion which is carried by the spoke section 5, to such an extent that each segment will be curved according to an arc of the circle corresponding to the reduced diameter. The pulley rim will therefore remain truly circular. As the pulley is contracted, the tongues 9 will enter farther into the slots 10 of the adjacent rim segments.

When it is desired to expand the pulley, the sleeve 22 is retarded by engaging the brake with the brake band 24, thus causing the spoke sections 5 and the nuts 14 to travel radially outward, the nuts traveling a greater distance than the adjustable spoke sections, to an extent corresponding to the straightening out or flattening required to adjust the curvature of the rim segments 8 to the increased diameter of the pulley. During this movement, the tongues 9 of the segments 8 are partly withdrawn from the slots 10 without however leaving them entirely, so that the pulley at all times has a continuous rim surface for engagement with the transmission belt.

When each rim segment consists of a single strip of sheet metal of uniform thickness, as shown in Figs. 1, 2 and 3, it will not assume a uniform circular curvature when bent as described above, for the reason that the resistance which the strip opposes to bending strains varies between the point of its attachment to the adjustable spoke section 5 and the points of connection with the curvature-adjusting rods 12, 13. Still, the departure from a truly circular form is not very great, and in many cases the approximation secured will be amply sufficient. If however more perfect conditions are desired, an absolutely uniform bending of the rim segments may be insured by constructing them as bodies opposing a uniform resistance to bending strains at all points. For example, as shown in Fig. 4, a compound or graduated leaf spring may be used as a rim segment. To the adjustable spoke section 5 are secured superposed sheet metal strips, say four, designated as 28, 29, 30 and 31 respectively, the strips or spring leaves increasing in length outwardly from leaf to leaf, that is to say, the innermost leaf 28 is the shortest, and the outermost leaf 31 the longest, their ends overlapping, as clearly shown in the drawing. The four leaves are of the same thickness, and each is tapered toward both ends in order to produce a body opposing a uniform resistance to bending strains throughout its length. Adjacent rim segments have a sliding connection similar to that described with reference to Figs. 1 to 3 the ends of the two outermost leaves 30, 31 being forked to form slots similar to the slots 10 of Figs. 2 and 3. Instead of having the rods 12, 13 pivoted to the fork members (as at 11 in Fig. 3) the fork members of the outermost leaves 31 are connected by a bridge or crossbar 32 in Fig. 4, and the rods 12, 13 are pivotally connected with the central portion of this bridge.

Various modifications may be made without departing from the nature of my invention as defined in the appended claims. Thus the form, relative arrangement and number of the curvature-adjusting members may be varied as desired. Instead of the rods 12, 13 adapted to exert pressure or a pull, I may employ, for instance, suitably fulcrumed levers. Similarly, according as devices of different types are employed for adjusting the outer spoke sections, different means may be employed to shift the curvature-adjusting members in the proper way to give the rim segments the curvature corresponding to the altered diameter of the pulley. Again, the flexible rim segments, instead of fitting into one another at their adjacent ends, as illustrated, may be made to overlap for the purpose of providing a continuous engagement surface for the transmission belt.

I claim:

1. In an expansible pulley provided with spoke sections movable radially with reference to the hub, a plurality of flexible rim segments, curvature-adjusting members connected with said segments, and means for shifting the movable spoke sections and simultaneously said adjusting members to make the curvature of the rim segments correspond to the changing diameter of the pulley.

2. An expansible pulley comprising a plurality of flexible rim segments, radially-adjustable carrying sections connected with the central portions of said segments, and curvature-adjusting members connected with the end portions of the segments, said members being connected with each other in pairs, the members of the same pair being connected with different segments.

3. An expansible pulley comprising a plurality of flexible rim segments, carrying sections connected with the central portions of the said segments and adjustable inward and outward, curvature-adjusting members connected with the end portions of the rim segments, and connections between the two members which are on opposite sides of the same carrying section.

4. An expansible pulley comprising a plurality of flexible rim segments, mechanism for moving them toward or from the center to vary the diameter of the pulley, and curvature-adjusting members, positively connected with said mechanism, and also connected with the end portions of the rim segments and adapted to pull them inward as the diameter of the pulley is decreased and to push them outward as the diameter is increased.

5. An expansible pulley comprising a plurality of flexible rim segments, mechanism connected with the central portions of the rim segments for moving them inward and outward, and curvature-adjusting members connected with the end portions of the rim segments.

6. An expansible pulley comprising a plurality of flexible rim segments, mechanism connected with the central portions of the rim segments for moving them inward and outward, curvature-adjusting members connected with the end portions of the rim segments, and a common operating device for said mechanism and for the said adjusting members.

7. An expansible pulley comprising a plurality of flexible rim segments, adjustable screw-threaded carrying members connected with the central portions of said segments, curvature-adjusting members connected with the end portions of said segments, screw-threaded actuating members connected with said adjusting members, and adjusting spindles provided with threads of different pitch, one of them in engagement with the screw thread of a carrying member, and the other with that of an actuating member.

8. An expansible pulley comprising a plurality of flexible rim segments, adjustable screw-threaded spoke sections projecting inwardly from the central portions of said segments, curvature-adjusting members connected with the end portions of the segments, nuts, connected with the inner ends of said members, and spindles having outer portions screw-threaded to engage said nuts, and provided at their inner portions with screw threads of a different pitch to engage said spoke sections.

9. An expansible pulley comprising a plurality of flexible rim segments, radial rotary spindles for shifting said segments inward or outward, shafts geared to said spindles and extending lengthwise of the pulley axis, pinions on said shafts, and means for driving said pinions either from the outside or from the inside to rotate the spindles in one direction or the other.

10. An expansible pulley comprising a plurality of flexible rim segments, radial rotary spindles for shifting said segments inward and outward, shafts geared to said spindles and extending lengthwise of the pulley axis, pinions on said shafts, and means for driving said pinions in unison in one direction or the other.

11. An expansible pulley comprising a plurality of flexible rim segments, radial rotary spindles for shifting said segments inward and outward, shafts geared to said spindles and extending lengthwise of the pulley axis, pinions on said shafts, and a reversible driving mechanism in engagement with all of said pinions.

In testimony whereof I have signed this specification in the presence of two subscribing witnesses.

CARL BADER.

Witnesses:
 WOLDEMAR HAUPT,
 HENRY HASPER.

Copies of this patent may be obtained for five cents each, by addressing the "Commissioner of Patents, Washington, D. C."